United States Patent [19]

Granzow

[11] 4,278,588
[45] Jul. 14, 1981

[54] PHOSPHINE OXIDE FLAME RETARDED, RUBBER-MODIFIED, POLYPHENYLENE ETHER RESIN COMPOSITIONS

[75] Inventor: Albrecht H. Granzow, Somerset, N.J.

[73] Assignee: American Cyanamid Company, Stamford, Conn.

[21] Appl. No.: 78,532

[22] Filed: Sep. 24, 1979

[51] Int. Cl.³ .............................................. C08K 3/32
[52] U.S. Cl. ................................. 260/45.7 P; 525/132
[58] Field of Search ................................... 260/45.7 P

[56] References Cited

U.S. PATENT DOCUMENTS

| | | | |
|---|---|---|---|
| 3,341,625 | 9/1967 | Gillham et al. | 260/45.7 P |
| 3,468,678 | 9/1969 | Clampitt et al. | 260/45.7 P |
| 3,716,580 | 2/1973 | Maier | 260/45.7 P |
| 3,931,104 | 1/1976 | Luders et al. | 260/45.7 P |
| 4,154,719 | 5/1979 | Abolins et al. | 260/45.7 P |
| 4,166,812 | 9/1979 | Lee | 260/45.7 P |

*Primary Examiner*—Harold D. Anderson
*Attorney, Agent, or Firm*—Bruce F. Jacobs

[57] ABSTRACT

Polyphenylene ether resin compositions are flame retarded by using specified phosphine oxides of the formula $$(R)_3P=O$$

wherein R is alkyl, haloalkyl, phenyl, halophenyl, benzyl, alkylbenzyl, or cycloalkyl.

6 Claims, No Drawings

PHOSPHINE OXIDE FLAME RETARDED, RUBBER-MODIFIED, POLYPHENYLENE ETHER RESIN COMPOSITIONS

The present invention relates to flame retarded polyphenylene ether resin compositions containing an effective flame retardant amount of a phosphine oxide compound represented by the formula:

$(R)_3P=O$ wherein R is alkyl containing about 1 to 6 carbon atoms, haloalkyl containing about 1 to 6 carbon atoms, phenyl, halophenyl containing about 1 to 3 halogen atoms, benzyl, alkylbenzyl containing 1 to 3 alkyl substituents each having about 1–4 carbon atoms or cycloalkyl containing about 5 to 8 carbon atoms. Preferably the halogens are chlorine or bromine. More particularly, the invention relates to flame retardant, rubber-modified polyphenylene ether thermoplastic resin compositions containing a compound of the above formula and, especially, to such compositions containing (1) tris(n-butyl)phosphine oxide or (2) tris(2,4,6-trimethylbenzyl)phosphine oxide.

Tris(n-butyl)phosphine oxide is a known compound, prepared according to the procedure of Davies et al., J. Chem. Soc. 1929, p. 33, by reaction of tri-n-butyl phosphine with nitric acid. Other alkyl phosphine oxides are similarly made.

Tris(2,4,6-trimethylbenzyl)phosphine oxide is prepared according to procedures described by Weston and Hillard, U.S. Pat. No. 4,053,518.

Procedures for the preparation of compounds useful in the present invention are described in Berlin et al., J. Org. Chem. 32, 129 (1967); Carson et al., J. Org. Chem. 26, 1467 (1961); Buckler, J. Am. Chem. Soc. 84, 3093 (1962).

Flame retardant, rubber-modified, polyphenylene ether resin compositions are made by incorporating therein an effective flame retarding amount of a compound of the above formula.

The polyphenylene ether resin compositions suitable for use in the present invention are described in U.S. Pat. No. 4,024,093, incorporated herein by reference. Basically, these resins comprise about 10 to 90 parts by weight of polyphenylene ether and about 90 to 10 parts by weight of a styrene polymer. Preferably, the polymer contains about 50 to 80 parts by weight of polyphenylene ether and about 50 to 20 parts by weight of styrene polymer. The styrene polymer is a rubber-modified, high-impact polystyrene. The resins are blends of the two polymers, which are mutually soluble and form a homogeneous polymer composition.

The flame retardant compounds are used in an amount sufficient to provide a self-extinguishing composition as defined below. In general, however, the amount used is at least about 4% by weight, based on the weight of resin, preferably at least about 6%.

The flame retardant compounds may be incorporated into the polymer by any method known in the art for doing so; however, it is preferable to incorporate the compounds by milling into the polymer on a conventional two-roll mill or by dry blending with the polymer, followed by extrusion.

It is also within the scope of the invention to incorporate such additional ingredients as plasticizers, dyes, pigments, heat and light stabilizers, antioxidants, antistatic agents, photochromic materials, and the like.

EXAMPLE 1

A total of 10 grams of a blend by 50 parts of polyphenylene ether/50 parts of rubber-modified impact polystyrene, containing 6% by weight of the compounds shown below, was extruded through a Melt Index Apparatus (described in ASTM D-1238) at 290°–300° C. The cylindrical extrudate, 3–5 inches long and 0.25 inch in diameter, was subjected to the following flammability test, described in Underwriters Laboratories Test UL-94, Vertical Test, Method 3.10–3.15 (Sept. 1973). The polymer specimen, clamped in a vertical position, is ignited with a ¾" blue flame (methane or natural gas) for 10 seconds, and the flame is withdrawn. If the flame is extinguished within 25 seconds, the sample is reignited for 10 seconds and the flame again withdrawn. The flame-extinguishment time is again recorded. If the flame-extinguishment time does not exceed 5 seconds for either flame application, the sample is rated V-0; if the flame-extinguishment time for either the first or second flame application is between 5–25 seconds, the sample is rated V-1. If a sample shows extinguishment times exceeding 25 seconds for either flame application, it is rated free-burning (FB) and is considered to have failed according to the test.

The following compounds are rated either V-0 or V-1, according to the above test, when incorporated into the resin at 6% by weight.
Triphenylphosphine oxide,
Tris(p-chlorobenzyl)phosphine oxide,
Tris(n-butyl)phosphine oxide,
Tris(n-propyl)phosphine oxide,
Tris(2,4,6-trimethylbenzyl)phosphine oxide,
Tris(cyclohexyl)phosphine oxide, and
Tris(chloromethyl)phosphine oxide.

EXAMPLE 2

The procedure of Example 1 is repeated except that the blend contains 70 parts of polyphenylene ether resin and 30 parts of polystyrene. When tested at a concentration of 4% by weight, the compounds are rated either V-0 or V-1, according to the test.

EXAMPLE 3

Following the procedure of Example 1, a determination was made of the flammability rating of a high-impact polystyrene containing 20% by weight of the compounds identified therein. When determined according to the UL-94 procedure, the specimens were free-burning (FB).

The examples illustrate that (1) for a 50/50 blend of polyphenylene ether resin, the compounds must be used at a concentration of at least 6% by weight to be effective flame retardants; (2) for a 70/30 blend, at least 4% by weight of the compound is required; and (3) the compounds are not effective flame retardants for polystyrene even at a concentration of 20% by weight.

What is claimed is:

1. A flame retardant composition comprising a homogenous blend of polymers containing about 10 to 90 parts by weight of polyphenylene ether resin, about 90 to 10 parts by weight of polystyrene, and a flame retardingly effective amount less than 6% by weight based upon the blend of polymers of a compound of the formula $(R)_3P=O$ wherein R is (alkyl containing about 1 to 6 carbon atoms) n-propyl or n-butyl.

2. The composition of claim 1 wherein the blend contains about 50 to 80 parts by weight polyphenylene ether resin and about 20 to 50 parts by weight of polystyrene.

3. The composition of claim 1 wherein the blend is about 50 parts polyphenylene ether and about 50 parts polystyrene.

4. The composition of claim 1 wherein the phosphine oxide is incorporated in an amount of about 4% by weight based upon the blend of polymers.

5. The composition of claim 4 wherein R is n-propyl.

6. The composition of claim 1 wherein R is n-butyl.

* * * * *